United States Patent
Nagar et al.

(10) Patent No.: US 11,521,425 B2
(45) Date of Patent: *Dec. 6, 2022

(54) COGNITIVE ENABLEMENT OF PRESENTERS

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Jagadesh Ramaswamy Hulugundi, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 16/864,903

(22) Filed: May 1, 2020

(65) Prior Publication Data
US 2021/0342574 A1 Nov. 4, 2021

(51) Int. Cl.
*G06V 40/16* (2022.01)
*G06N 20/00* (2019.01)
(Continued)

(52) U.S. Cl.
CPC ......... *G06V 40/172* (2022.01); *G02B 27/017* (2013.01); *G06F 16/9535* (2019.01);
(Continued)

(58) Field of Classification Search
CPC .... G06V 40/172; G06V 20/20; G06V 40/174; G06V 10/46; G06V 40/20; G06V 10/225;
(Continued)

(56) References Cited

U.S. PATENT DOCUMENTS 9,041,766 B1 * 5/2015 Gates .................. H04N 7/15
348/14.08
9,925,466 B2 3/2018 Mizrahi et al.
(Continued)

OTHER PUBLICATIONS

IBM: List of IBM Patents or Patent Applications Treated as Related, Mar. 25, 2021, 2 pg.
(Continued)

*Primary Examiner* — Nimesh Patel
(74) *Attorney, Agent, or Firm* — Cuenot, Forsythe & Kim, LLC (57) ABSTRACT

Cognitive enablement can include detecting sensor-generated signals received from one or more network-configured sensors, the sensor-generated signals corresponding to physical movement of an audience member during a presentation by a presenter. The sensor-generated signals can be converted to vectorized data structures for inputting to a classification model generated with machine learning. The physical movement can be classified as a prelude to a likely audience interaction, the classifying performed by the classification model based on the vectorized data structures. In response to the classifying, an audience member attribute associated with the audience member can be determined. An audience interaction can be predicted based on the audience member attribute using a prediction model generated with machine learning. A predictive alert corresponding to the predicted audience interaction can be generated. During the presentation, a user interface for displaying the predictive alert to the presenter can be generated using an electronic device.

12 Claims, 6 Drawing Sheets

(51) Int. Cl.
*G06F 16/9535* (2019.01)
*G02B 27/01* (2006.01)
*G06V 20/20* (2022.01)

(52) U.S. Cl.
CPC .............. *G06N 20/00* (2019.01); *G06V 20/20* (2022.01); *G06V 40/174* (2022.01)

(58) Field of Classification Search
CPC ...... G06V 10/10; G06V 10/462; G06V 10/96; G06V 40/10; G06V 40/1312; G06V 40/1353; G02B 27/017; G06F 16/9535; G06F 3/048; G06F 16/95; G06F 3/0488; G06F 3/04883; G06F 2203/04808; G06F 21/32; G06F 3/017; G06F 9/451; G06F 2203/04106; G06F 3/14; G06F 16/289; G06N 20/00; G06N 3/006; G06N 3/0454; G06N 3/08; G06N 7/005; G06K 9/6267; H04M 3/567; H04M 1/247; H04M 2250/52; H04M 1/72439; H04L 12/1818; H04L 51/32; H04L 67/1095; H04L 67/22; H04L 9/3231
See application file for complete search history.

(56) References Cited

U.S. PATENT DOCUMENTS

2010/0153497 A1* 6/2010 Sylvain .................... H04N 7/15 709/204
2016/0011729 A1 1/2016 Flores et al.
2018/0376108 A1* 12/2018 Bright-Thomas .... G06K 9/6274

OTHER PUBLICATIONS

Nagar, R.P. et al., "Cognitive Enablement of Presenters", U.S. Appl. No. 17/133,633, filed Dec. 24, 2020, 40 pages (A copy is not provided as this application is available to the Examiner.).

"Method and System for Virtual Reality Based Mock Preparation with Predicted Q&A," [online] IP.com Prior Art Database Technical Disclosure No. IPCOM000251696D, Nov. 27, 2017, retrieved from the Internet: <https://priorart.ip.com/IPCOM/000251696>, 4 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

```
┌─────────────────────────────────────────────────────────────┐
│ Detect sensor-generated signals received from network-configured sensors │
│ and corresponding to physical movement of a member of an audience during │
│              a presentation by a presenter                   │
│                           302                                │
└─────────────────────────────────────────────────────────────┘
                              │
                              ▼
┌─────────────────────────────────────────────────────────────┐
│    Convert sensor-generated signals to vectorized data structure │
│        for input into machine learning classification model  │
│                           304                                │
└─────────────────────────────────────────────────────────────┘
                              │
                              ▼
┌─────────────────────────────────────────────────────────────┐
│    Based on the vectorized data structures, classify physical │
│    movement as a prelude to a likely audience interaction using │
│      a classification model generated with machine learning  │
│                           306                                │
└─────────────────────────────────────────────────────────────┘
                              │
                              ▼
┌─────────────────────────────────────────────────────────────┐
│       Determine audience member attribute associated in      │
│                response to the classifying                   │
│                           308                                │
└─────────────────────────────────────────────────────────────┘
                              │
                              ▼
┌─────────────────────────────────────────────────────────────┐
│        Predict audience interaction based on audience member │
│        attribute using machine leaning prediction model      │
│                           310                                │
└─────────────────────────────────────────────────────────────┘
                              │
                              ▼
┌─────────────────────────────────────────────────────────────┐
│        Generate predictive alert corresponding to predicted  │
│                     audience interaction                     │
│                           312                                │
└─────────────────────────────────────────────────────────────┘
                              │
                              ▼
┌─────────────────────────────────────────────────────────────┐
│       Generate user interface for displaying predictive alert │
│                           314                                │
└─────────────────────────────────────────────────────────────┘
```

COGNITIVE ENABLEMENT OF PRESENTERS

BACKGROUND

This disclosure relates to electronic communications, and more particularly, to online presentations over data communications networks and in-person presentations enhanced by using electronic communications devices.

Lectures, conferences, and various types of group presentations are increasingly conducted over data communications networks. For example, web conferencing—including webinars, webcasts, and peer-level web meetings—enables real-time point-to-point communications over the Internet. Various telecommunications applications, for example, enable video chats and voice calls over various types over data communications networks. These and other technologies enable uses to easily and efficiently communicate even though remotely located from one another.

SUMMARY

In one or more embodiments, a method can include detecting sensor-generated signals received from at least one of a plurality of dispersed network-configured sensors, the sensor-generated signals corresponding to physical movement of a member of an audience during a presentation by a presenter. The method can include converting the sensor-generated signals to vectorized data structures for inputting to a classification model generated with machine learning. The method also can include classifying the physical movement as a prelude to a likely audience interaction, the classifying performed by the classification model based on the vectorized data structures. Additionally, the method can include determining an audience member attribute associated with the member of the audience in response to the classifying. The method also can include predicting an audience interaction based on the audience member attribute using a prediction model generated with machine learning. The method also can include generating a predictive alert corresponding to the audience interaction predicted and generating a user interface for displaying the predictive alert to the presenter during the presentation using an electronic device.

In one or more embodiments, a system includes a processor configured to initiate operations. The operations can include detecting sensor-generated signals received from at least one of a plurality of dispersed network-configured sensors, the sensor-generated signals corresponding to physical movement of a member of an audience during a presentation by a presenter. The operations can include converting the sensor-generated signals to vectorized data structures for inputting to a classification model generated with machine learning. The operations also can include classifying the physical movement as a prelude to a likely audience interaction, the classifying performed by the classification model based on the vectorized data structures. Additionally, the operations can include determining an audience member attribute associated with the member of the audience in response to the classifying. The operations also can include predicting an audience interaction based on the audience member attribute using a prediction model generated with machine learning. The operations also can include generating a predictive alert corresponding to the audience interaction predicted and generating a user interface for displaying the predictive alert to the presenter during the presentation using an electronic device.

In one or more embodiments, a computer program product includes one or more computer readable storage media having instructions stored thereon. The instructions are executable by a processor to initiate operations. The operations can include detecting sensor-generated signals received from at least one of a plurality of dispersed network-configured sensors, the sensor-generated signals corresponding to physical movement of a member of an audience during a presentation by a presenter. The operations can include converting the sensor-generated signals to vectorized data structures for inputting to a classification model generated with machine learning. The operations also can include classifying the physical movement as a prelude to a likely audience interaction, the classifying performed by the classification model based on the vectorized data structures. Additionally, the operations can include determining an audience member attribute associated with the member of the audience in response to the classifying. The operations also can include predicting an audience interaction based on the audience member attribute using a prediction model generated with machine learning. The operations also can include generating a predictive alert corresponding to the audience interaction predicted and generating a user interface for displaying the predictive alert to the presenter during the presentation using an electronic device.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic communications, and more particularly, to online presentations over data communications networks and in-person presentations enhanced by using electronic devices. The computer technologies used to facilitate group presentations typically do not enable a presenter to predict which audience member will interact with the presenter, say, by posing a question or contributing some information, opinion, or insight. Computer technology also typically does not predict the nature of the interaction or the likely topic addressed by the question or contribution. Not knowing who among an audience is likely to interact or how or on what topic can impede a presenter's ability to focus at various points within the presentation on one or more specific audience members or on one or more pertinent topics.

The arrangements described herein are directed to computer technology and provide an improvement to existing computer technology. Specifically, the arrangements improve computer technology used for online and in-person presentations by predicting which audience members are likely to ask a question or voice a comment on a specific topic during a presentation. The arrangements, moreover, extend presently available computer technology to provide the same capabilities to a presenter making an in-person presentation to an audience.

The arrangements described herein can detect, based on received electronic data (e.g., video, sensor data), a physical movement of an audience member during a presentation by a presenter. A physical movement, for example, can be raising a hand, leaning toward a microphone, or other body movement. Based on machine learning classification, the physical movement can be classified as to whether it is a prelude to the audience member posing a question or providing a comment or other audience interaction. As defined herein, "prelude to an audience interaction" is a probabilistically determined expectation that an audience interaction will occur within a predetermined time interval following an indicated event. The audience interaction (defined below) can include an audience member posing a question or providing a comment. The indicated event as described herein is a physical movement of the audience member.

In response to determining that the detected movement is a prelude to an audience interaction, one or more audience member attributes corresponding to the audience member are obtained. As defined herein, an "audience member attribute" is a biographical characteristic of an audience member. A biographical characteristic, for example, can include an audience member's interests, experience, education, and/or expertise, especially with respect to a topic presented. Audience member attributes can be provided by audience members themselves or retrieved from data communications network sites, such as social networking sites, professional organization sites, university and/or commercial web sites, and various other sources communicatively coupled to a data communications network.

An audience interaction is predicted based on the audience member attribute. As defined herein, "audience interaction" is any verbal or textual interaction between an audience member and the presenter. For example, an audience interaction can be a question posed by the audience member. An audience interaction, for example, can be an audience member's statement of fact, expression of opinion, or other comment made during the presentation. Predictions thus encompass which audience members are likely to either ask a question or voice a comment. Also predicted is the topic or topics of the expected question or comment. The one or more topics can be predicted based on the biographical characteristics of the audience member.

Thus, for an identified audience member whose physical movement is detected, a prediction is made, based on the audience member's biographical characteristics, predicting either that the audience member is likely to pose a question or provide a comment and identifying the likely topic. The predications are made using predication models generated through machine learning. The machine learning models can include convolutional neural networks, support vector machines, deep learning classification models, and multivariate regression models. Machine learning essentially enables machines (computers) to "learn" to discover statistical relationships. In artificial intelligence, such statistical relationships have proven more robust than rule-based processing of data.

Based on the predictions, a predictive alert is generated. The predictive alert can be displayed on a user interface. As defined herein, "predictive alert" is an electronic message indicating the predicted audience interaction as well as the identity of audience member predicted to engage in the interaction. In the context of an online presentation, for example, the predictive alert can be presented to the presenter in a user interface (e.g., graphical user interface) on the screen of an electronic device (e.g., computer system) used by the presenter during on online and/or in-person presentation. In the context of an in-person presentation, the interaction indication can be displayed on the glass of a pair of augmented reality (AR) glasses worn by the presenter during the presentation, for example.

Consider an illustrative scenario in which a professor is presenting online and/or in-person a lecture on computer technology. An audience member's physical movement (detected, e.g., from a video image, an IoT feed, or a wearable device sensor signal) generates a prediction that the audience member is soon to engage in an audience interaction. The audience member is identified and audience member attributes corresponding to the audience member are retrieved. Based on the audience member attributes (e.g., experience, education, expertise, interests), the audience interaction is predicted to be the posing of a question or making a comment. For example, if the audience member attributes indicate that the audience member is a student, the prediction is that the audience interaction is likely the student will pose a question. If, however, the audience member attributes indicate, for example, that the audience member is a professor, then it is likely that the professor will provide a comment embellishing a topic.

Moreover, the machine learning prediction model can predict based on the audience member attributes the specific topic of the audience interaction. For example, if the prediction is a comment from an identified professor who, based on the audience member attributes, has extensive expertise in compilers, the prediction is that the comment will relate to compilers. The predictions can be conveyed to the presenter (e.g., on a computer display screen and/or AR glasses), thus enabling the presenter to focus the presentation on the specific individual and/or topic. In other scenarios, such as a conference or other event in which multiple presentations are made by multiple participants, different participants at different times may assume different roles. For example, at one time during an event the role of a conference participant may be that of presenter, and at another time, that of audience member.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
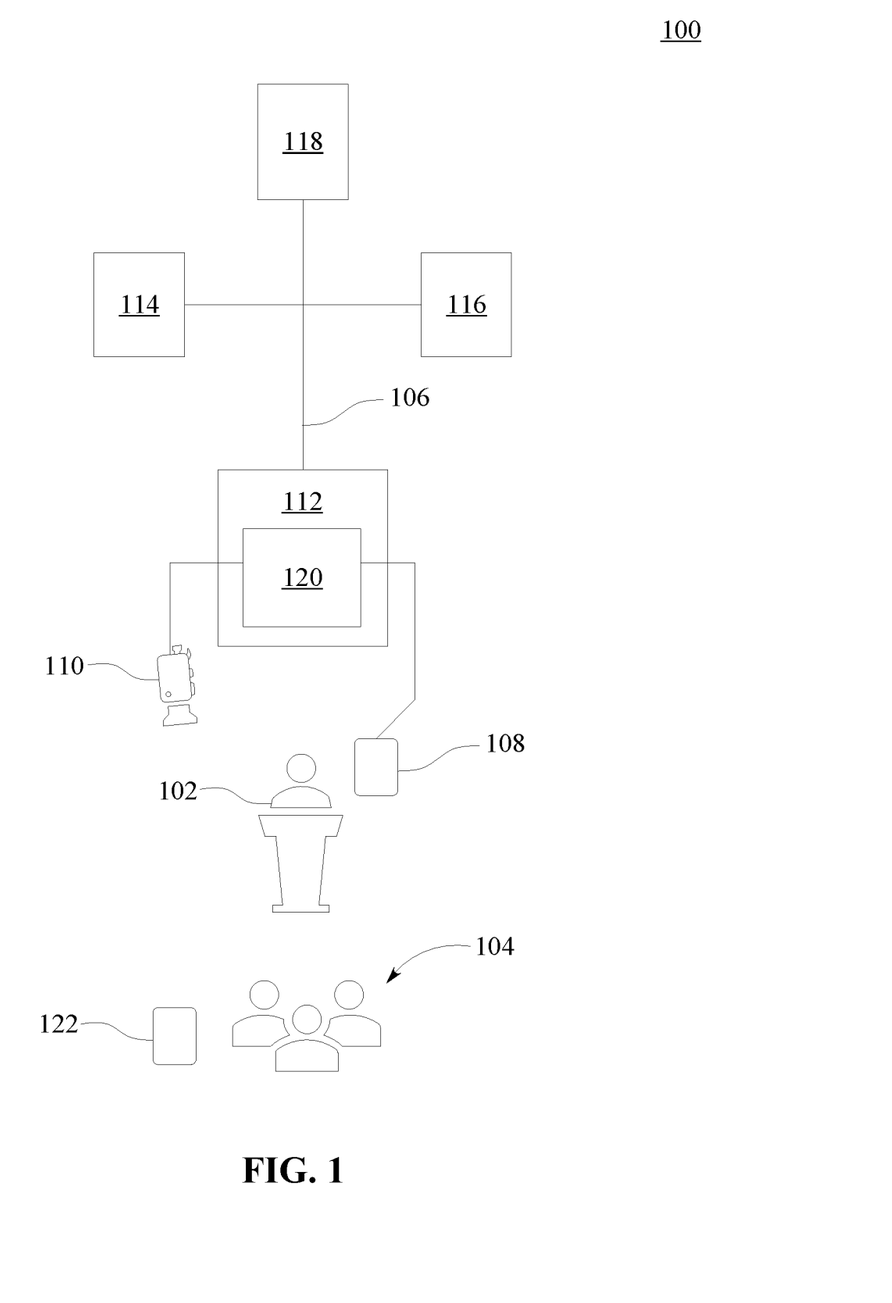
FIG. 1 depicts an example presentation environment in which a cognitive enablement system is operable according to an embodiment.

FIG. 1 depicts example presentation environment 100 in which a cognitive enablement system is operable according to an embodiment. Presentation environment 100 illustratively includes presenter 102 who engages in an in-person presentation before audience 104. As illustrated, the presentation by presenter 102 can additionally, or alternatively, be presented online over data communications network 106. In certain embodiments, therefore, a presentation is simultaneously made to one group of audience members in person and to another group via data electronic devices communicatively coupled to a data communications network.

Illustratively, presentation environment 100 includes user device 108 and camera 110, communicatively coupled to computing node 112. User device 108 can include a microphone for capturing speech of presenter 102. Camera 110 can capture visual images (e.g., video) of presenter 102 and members of audience 104. Thus, presentation environment 100 can include one or both of audience 104, in person, or a dispersed audience linked over data communications network 106. In various embodiments in which an audience includes in-person audience members, user device 108 can comprise AR glasses or smart glasses worn by presenter 102 as described below.

Remotely located audience members can access the presentation using electronic devices 114, 116, and 118 communicatively linked to data communications network 106. Although only three electronic devices are shown, it will be readily apparent that more electronic devices of the various types described below can communicatively link to computing node 112 via data communications network 106 for remotely receiving the presentation by presenter 102.

Electronic devices 114, 116, and 118 can comprise various types of devices such as, for example, computers (e.g., desktop, laptop, tablet computer), smartphones or other mobile devices, smart TVs, and/or other communication devices, including ones endowed with computing capabilities. It will be appreciated that in various embodiments one or more of electronic devices 114, 116, and 118 can be deployed as standalone devices or deployed as multiple devices in a distributed client-server networked system. For example, in certain embodiments, a smartwatch can operatively couple to a mobile device (e.g., phone).

Data communications network 106 provides communication links between various devices and data processing systems. Data communications network 106 can link remotely located audience members using electronic devices 114, 116, and 118 to web conferencing platforms, instant messaging platforms, and/or other networked computing nodes that support telecommunications applications for providing video chat services and/or voice calls between computers, smart phones and other mobile devices, smart TVs, smartwatches, and the like over the Internet or other data communications network. The communication links can include connections, such as wired communication links, wireless communication links, or fiber optic cables, and can be implemented as, or include, one or more (or any combination of) different communication technologies such as a wide area network (WAN), a local area network (LAN), a wireless network (e.g., a wireless WAN and/or a wireless LAN), a mobile or cellular network, a virtual private network (VPN), the Internet, a public switched telephone network (PSTN), and so forth.

As defined herein, "communication link" means a mode of communication using one or more electronic devices. A communication link is associated with a specific format and/or communication protocol for sending and receiving communications. For example, using a specific format and/or communication protocol, an electronic device can send a communication to another electronic device as a video call, a voice call, text message, and/or a post to a social or other networking system. A communication link for video calls is considered a distinct communication link. Likewise, a communication link for voice calls is a distinct communication link, as is a communication link for instant messages. So, too, a communication link used for posting to a social networking system is considered a distinct communication link. That is, each type of communication link corresponding to a different type or mode of communication is considered a distinct communication link.

Figure 6:
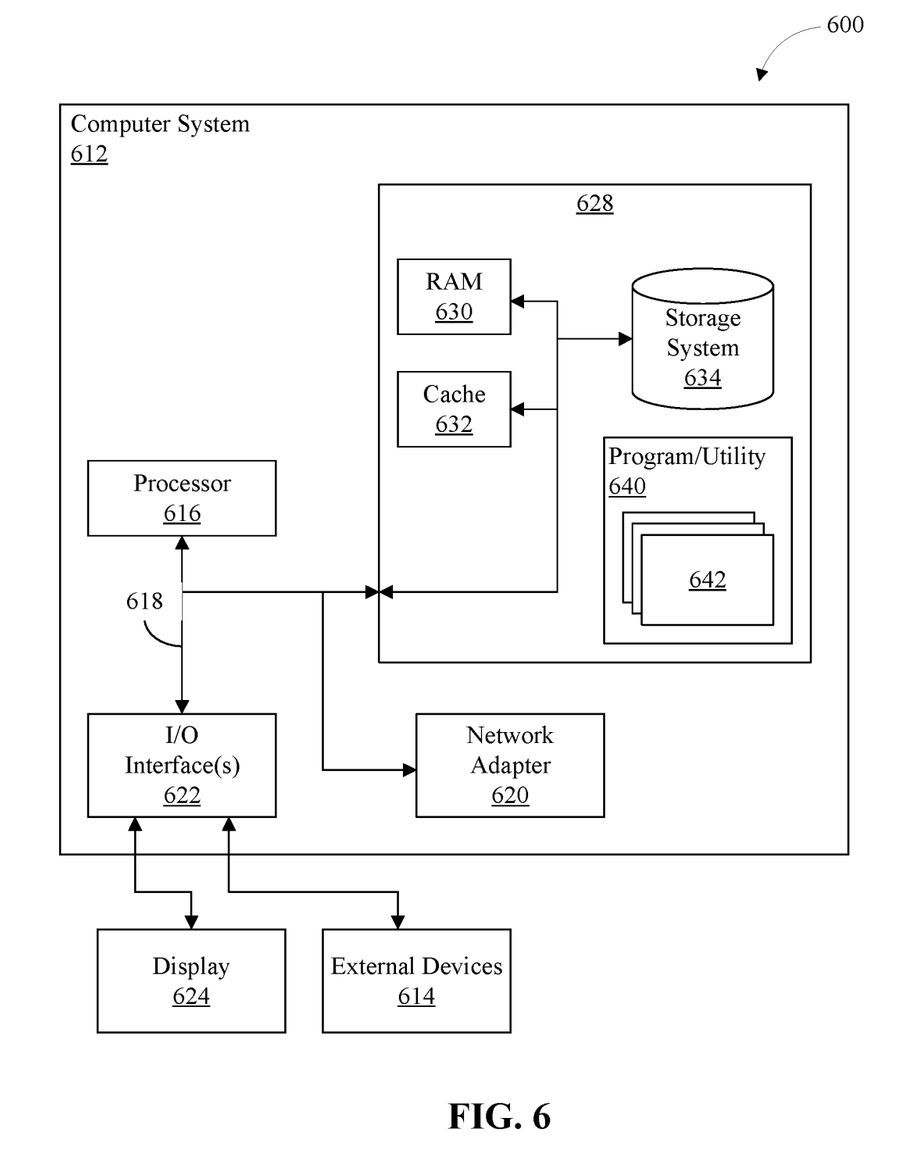
FIG. 6 depicts a cloud computing node according to an embodiment.

Presentation environment 100 illustratively includes cognitive enablement system 120, which is implemented in computing node 112. Optionally, presentation environment can also include one or more network-configured sensors 122 (described below) adjacent to, or carried or worn by, members of audience 104 that communicatively couple with cognitive enablement system 120. Cognitive enablement system 120, in certain embodiments, is implemented in computer-system instructions (software) executable on one or more processors, such as processor(s) 616 of computer system 612 (FIG. 6). In other embodiments, cognitive system 120 can be implemented in dedicated circuitry or a combination of software and dedicated circuitry. Cognitive enablement system 120 can be implemented in a stand-alone computing system that communicatively couples with data communications network 106, or integrated in a computing node, such as computing node 600 (FIG. 6). For example, cognitive enablement system 120 can be integrated in a web conferencing platform or telecommunications platform that enables users to communicate over a data communications network (e.g., Internet) by voice using a microphone and by video using a webcam.

Figure 2:
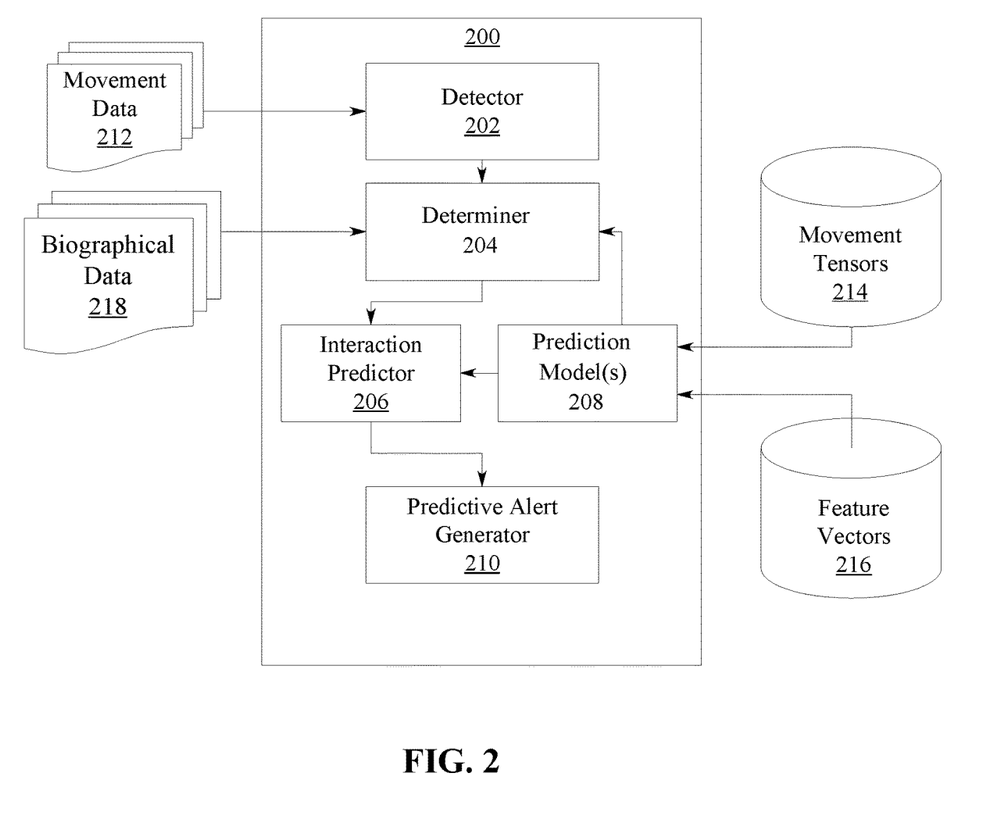
FIG. 2 depicts a cognitive enablement system according to an embodiment.

FIG. 2 depicts in greater detail an example cognitive enablement system. Cognitive enablement system 200, according to an embodiment, illustratively includes detector 202, determiner 204, interaction predictor 206, prediction models 208, and predictive alert generator 210. Cognitive enablement system 200 facilitates an in-person presentation by a presenter before an audience co-located with the presenter and/or an online presentation to a dispersed audience comprising remotely located audience members. The presentation can be any type of presentation, such as a lecture by a single presenter, one of a series of presentations by multiple participants during a conference or other event, or any of various other types of presentations involving multiple participants.

Operatively, detector 202 detects an audience member's physical movement, and in response, determiner 204 determines one or more audience member attributes of the audience member. Interaction predictor 206, based on the one or more audience member attributes, predicts a likely audience interaction. Interaction predictor 206 can predict audience interactions using one or more prediction models 208. Based on the prediction, predictive alert generator 210 conveys a predictive alert to the presenter.

During a presentation, detector 202 initially detects physical movements of audience members. Physical movements can be detected from video of the audience members. The video can be captured, for example, by one or more cameras located at the venue of an in-person presentation. For online presentations, video can be fed to cognitive enablement system 200 over a data communications network to which audience members connect to participate in the presentation using electronic devices that include cameras, for example.

In other embodiments, detector 202 can alternatively, or additionally, detect physical movements of audience members based on sensor-based signals received from IoT devices proximate to audience members. For example, during an online presentation, an audience member in an office environment or at home and remote from the presenter may utilize an IoT device motion detector. The motion detector generates a signal in response to the audience member's movements. Motion detector sensors are capable of distinguishing between different kinds of movements. For example, the sensors can identify the raising or waving of a hand by an audience member proximate to the motion detector. As with IoT devices generally, a motion detector can be assigned a unique identifier and is capable of transferring signal data over a data communications network (e.g., the Internet) to cognitive enablement system 200 without human-to-human or human-to-computer interaction. The unique identifier can be used by cognitive enablement system 200 to identify the audience member whose physical movement is detected.

In still other embodiments, detector 202 can alternatively, or additionally, detect physical movements of audience members based on signals received from an audience member's mobile device (e.g., smartphone) or a wearable device (e.g., smart watch) worn by the audience member. Smartphones and smart watches, for example, typically include sensors that detect physical movement. Orientation and rotation, for example, can be detected using a gyroscope to measure angular velocity. A gyroscope is typically included in such devices. An accelerometer, also typically included in such devices, can track basic movements in all directions, such as tilt, inclination, and orientation of the body. In various embodiments, other wearable devices also can be used to detect an audience member's physical movements. Cognitive enablement system 200, in certain embodiments, operatively couples to a wireless receiver for receiving wireless signals transmitted by a device conveying data corresponding to an audience member's physical movement.

Thus, physical movements of audience members can be detected from signals received from one or more sensors operatively coupled to cognitive enablement system 200. In various embodiments, as described, the sensor can comprise one or more cameras and/or one or more motion sensors. For an audience of dispersed members, wherein the presentation is an online presentation, the cameras can be cameras connected to members' computers or other IoT devices capable of capturing images of the audience members. For an in-person presentation, sensors can be communicatively coupled to a computer or other data processing device and can comprise one or more cameras positioned to capture video images of the members in the audience. In certain embodiments, one or more members of the dispersed audience may carry a mobile device or wear a device capable of sensing movements and transmitting wirelessly or over a data communications network signals indicating the movements. Sensors, including camera sensors, motion sensors, and/or other IoT devices can be used to visually capture or physically sense physical movements of members of the audience. For audience members attending a presentation using an audio-only device, a motion-detecting device other than a camera can be used to detect physical movement of an audience member.

In response to movement data 212 (based on video and/or sensor-based signals), detector 202 can detect an audience member's physical movements. Determiner 204 can determine whether the detected physical movement is a likely prelude to an audience interaction (e.g., question or comment) based on a prediction made using one of prediction models 208. The prediction model can be a classification model trained using machine learning.

The prediction model for classifying physical movements, in certain embodiments, is trained using machine learning to classify physical actions based on video of audience members during past presentations. The prediction model is trained using a set of training data derived from camera-captured videos and stored in a database of movement tensors 214. Video data can be stored as five-dimensional (5D) tensors constructed in the format (samples, frames, height, width, color_depth). In certain embodiments, a model for classifying video can be constructed as a convolutional neural network (CNN) similar to a CNN model for classifying images. Another technique is to use a pipeline of bag-of-visual-words (BoVW), an algorithmic extension of the well-known bag-of-words technique frequently employed for natural language processing and information retrieval. BoVW features are quantized into a k-means dictionary and classified with a machine learning model such as a support vector machine (SVM). Specific features in an image can be detected using a scale-invariant feature transform (SIFT) or similar such algorithm prior to generating visual statistics of image features. Principal component analysis (PCA) can be used to identify the most common features and rapidly match image features with classified features.

In other embodiments, the prediction model can be trained using other machine learning techniques to classify physical movements based on data other than video, such as data generated, for example, by an audience member's mobile device or by a wearable device worn by the audience member or by an IoT device proximate to the audience member. Regardless of whether signals are generated by a camera sensor, an IoT motion sensor, or other type of sensor, cognitive enablement system 200 converts the sensor-generated signals into vectorized data structures that can be input into the one or more classification models 208.

Optionally, an identification of the audience member who is predicted to engage in an audience interaction can be made before or at the time that the prediction is made based on detecting the audience member's movement. Individual audience members can be identified in alternative ways by cognitive enablement system 200.

A wearable device can identify an audience member. For example, cognitive enablement system 200 can identify members of an audience gathered for an in-person presentation based on name tags, images of which are captured by a camera. Cognitive enablement system 200 can obtain images of the name tags and perform character recognition to determine audience member identities. In the context of an online presentation to remote audience members, audience members can be identified during a dial-in phase in which remote audience members self-identify or are identified based on a call-originating number of an audience member's conventional phone or smart phone or user device identifier. Cognitive enablement system 200, in the context of an online or in-person presentation, alternatively can rely on facial recognition technology to identify an audience member from an image captured by a camera at the presentation venue or, if the audience member is remotely located, from a camera at the remote location, such as a camera integrated in the electronic device used by the audience member to connect to the presentation over a data communications network.

Having classified an audience member's physical movement as likely to lead to an audience interaction, the prediction based on a machine learning classification model, determiner 204 determines one or more audience member attributes of the audience member identified as making the physical movement.

Audience member attributes can be derived from biographical data. Prior to or during an online presentation, members of the audience can convey biographical data to cognitive enablement system 200 over a data communications network. Alternatively, once an audience member is identified (prior to or during an online or in-person presentation), cognitive enablement system 200 can retrieve biographical data corresponding to the audience member from various networked sources, such as social networking sites, professional organization websites, university or commercial websites, or any of various other sites at which audience members post biographical information of themselves. Thus, cognitive enablement system 200 is able both to identify members of an audience (online and/or in-person) and associate specific attributes (e.g., expertise, experience, education, interests) with the identified audience members.

Interaction predictor 206 predicts an audience interaction according to type and topic based on another prediction model that also is trained using machine learning. For example, interaction predictor 206 can predict whether the audience interaction predicted will be a question posed to the presenter or comment about a presentation topic. For example, an audience member having certain credentials, such as education, expertise, and/or experience, may be probabilistically more likely to contribute a comment rather than pose a question. Also based on the audience member attributes of the audience member predicted to engage in the audience interaction, the topic of the question or comment can be predicted by interaction predictor 206. For example, if the audience member has an identifiable interest, expertise, or experience pertaining to a specific topic, an audience interaction with the audience member is probabilistically more likely to involve that specific topic.

In certain embodiments, the model used to make the prediction is a deep learning neural network. The deep learning neural network can be trained to predict the audience interaction using training set of feature vectors 216. The feature vectors can comprise elements corresponding to one or more topics and certain characteristics or attributes of participants in a prior presentation on the one or more topics. For example, the feature vector (topic, areas of expertise, education level, topical experience, label) can be used to train a classification model, the feature vector comprising a label (classifying the interaction of an individual during a presentation) determined based on the specified topic and the individual's expertise, education, and experience. In other embodiments, reinforcement learning can be used to train the classification model by creating an "agent" that seeks to maximize a "reward" by correctly predicting audience interactions in repeated classifications made in the context of a repeated presentations.

Post-classification processing using, for example, a multivariate regression model can generate probabilities $p(z_{ij}|x, y)$ of a specific audience interaction (e.g., i=0 indicates question, i=1 indicates comment) given feature vector x corresponding to the audience attributes (e.g., education, expertise, experience, interests) an individual audience member and feature vector y corresponding to one or more topics of a presentation. During a presentation, interaction predictor 206 can predict an audience interaction based on inputs of biographical data 218 that cognitive enablement system 200 converts to vectorized data structures for inputting to the prediction model used to predict the audience interaction. Vectorized data inputs can correspond to the topic of presentation as well as audience attributes of an audience member predicted to engage in the audience interaction.

Based on a predicted audience interaction, predictive alert generator 210 generates a predictive alert and conveys the predictive alert to the presenter. Cognitive enablement system 200 can generate a user interface for displaying the predictive alert. The predictive alert can be displayed in the user interface on the display of a computer system, such as display 624 of computer system 612 (FIG. 6), used in presenting over a data communications network. The predictive alert can be displayed in the user interface on the display of a computing/communication device (e.g., a computer capable of communicating via a data communications network or communication device having data processing capabilities and display screen) used by the presenter during either an online presentation and/or an in-person presentation. If the presenter is making an in-person presentation, whether or not simultaneously conveying the presentation online, predictive alert generator 210 can project the prediction alert, for example, on the glass of AR glasses worn by the presenter and/or via another computing/communication device (e.g., computer, mobile phone, smart watch, etc.). During a presentation made strictly on-line, predictive alert generator 210 can project the prediction alert on an AR device (e.g., AR glasses) alone or in addition to presenting the predictive alert in a user interface of a display of a computing/communication device used by the presenter.

In some embodiments, predictive alert generator 210 generates a mock seating chart corresponding to the complement of audience members attending a presentation (e.g., online). The mock seating chart can be displayed on the display screen of a computing device, for example. Each chart position can correspond to the name of an audience member. A predictive alert can be presented by predictive alert generator 210 highlighting (e.g., by color, by bolding) or otherwise showing a contrast between an audience member predicted to engage in an audience interaction and all other names on the mock seating chart. The predictive alert generated by predictive alert generator 210 can also indicate data corresponding to the identified audience member, such as interests, experience, education, or expertise of the audience member. The predictive alert can show the prediction that the audience interaction is likely to be a question, comment, or similar such audience interaction, and indicate the likely topic or topics of the audience interaction.

In other embodiments, predictive alert generator 210 presents the predictive alert on an AR device. For example, the predictive alert can be presented on AR glasses worn by the presenter addressing an audience in-person. The predictive alert can be superimposed by predictive alert generator 210 on the presenter's view of the audience seen through the AR glasses. In response to an audience member being identified by determiner 204 as likely to engage in an audience interaction, the name of the audience member can be shown on the glasses above the audience member's real-world image seen through the glasses. With AR glasses worn by a presenter, for example, when the audience member predicted to soon engage in an audience interaction is within a presenter's line of sight, the predictive alert can highlight or superimpose a geometric figure (e.g., square) around the head or upper portion of the audience member's body to single out the audience member from other members of the audience. Adjacent thereto, the predictive alert can display text indicating, for example, a predicted topic or topics of the expected audience interaction and/or biographical data (e.g., expertise, experience, education, interests) corresponding to the audience member singled out. Thus, the predictive alert text generated by predictive alert generator 210 can indicate that the audience interaction is likely to be a question, comment, or similar such audience interaction and also can indicate the likely topic or topics of the audience interaction, for example.

Cognitive enablement system 200 can enable a presenter presenting via a data communications network to a first group of an audience online, while simultaneously addressing a second group of the audience in person, to receive predictive alerts regarding online audience interactions that the presenter would not otherwise easily observe. In response to a predicted audience interaction by an online audience member, a user interface generated by cognitive enablement system 200 can display a predictive alert that includes an image of the online audience member (who being online rather than in person is otherwise unobserved) and text adjacent to the image indicating a likely topic or topics of a predicted question or a predicted comment.

Figure 3:
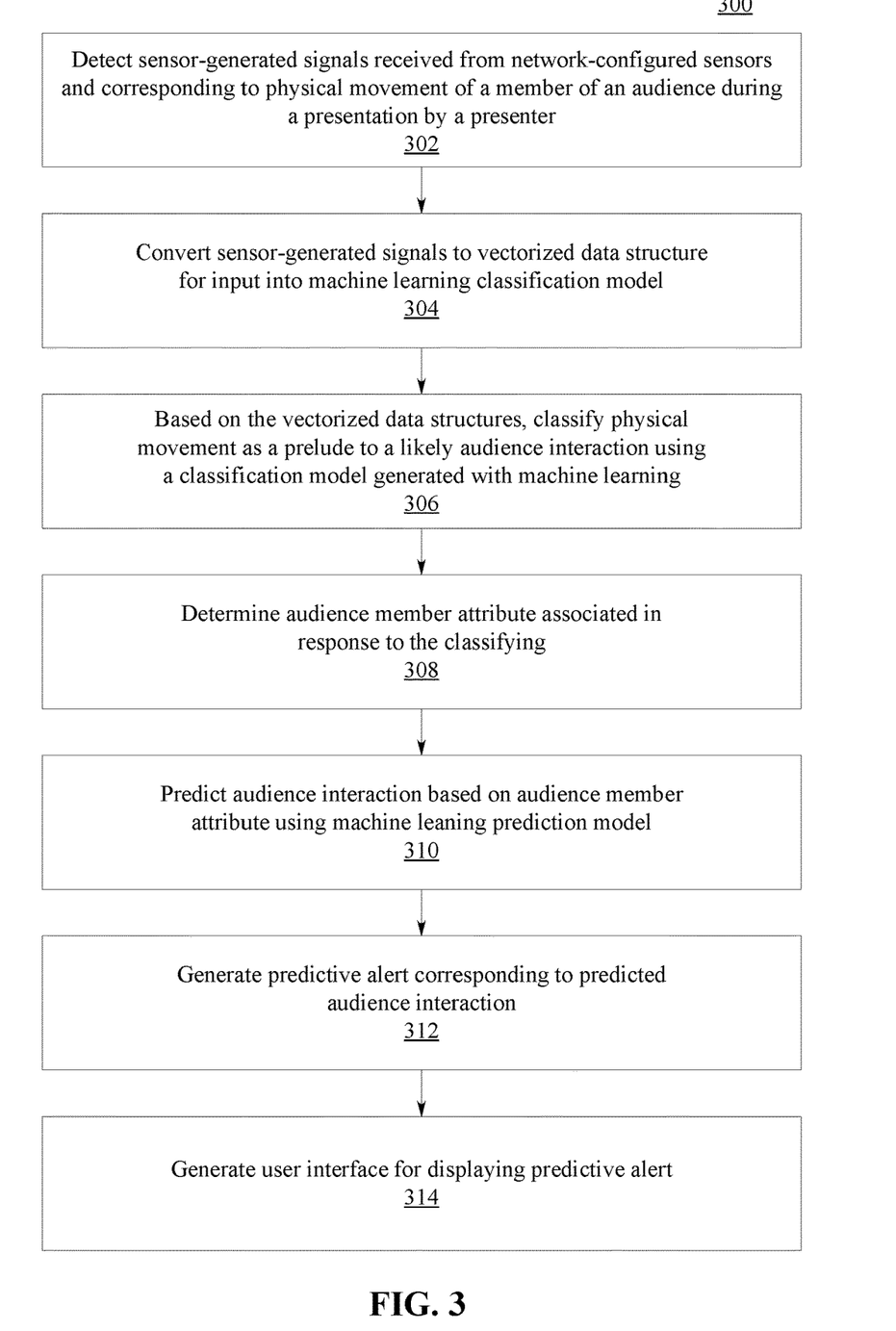
FIG. 3 depicts a flowchart of a method of cognitive enablement according to an embodiment.

FIG. 3 is a flowchart of method 300 for the cognitive enablement of a presenter according to an embodiment. Method 300 can be performed by the same or similar systems as are described with reference to FIGS. 1 and 2. The system at block 302 detects sensor-generated signals received from one or more dispersed network-configured sensors and corresponding to physical movement of a member of an audience during a presentation by a presenter. The network-configured sensors can include IoT motion sensors, mobile device sensors (e.g., smartphone sensors), wearable device sensors (e.g., smart watch sensors), camera sensors, and/or other such sensors communicatively coupled to a data communications network.

At block 304, the system converts the sensor-generated signals into vectorized data structures for inputting to a classification model generated with machine learning. The system at block 306 classifies the physical movement as a prelude to a likely audience interaction. Based on the vectorized data structures, the system classifies the physical movement using a classification model generated using machine learning. The machine learning classification model can comprise, for example, a CNN, a SVM, or utilize PCA.

In response to the classifying, the system at block 308 determines an audience member attribute associated with the member of the audience. The audience member attribute can include the identity of the member of the audience. The audience member attribute can include biographical data corresponding to the member of the audience. Biographical data can correspond to an expertise, experience, education, and/or interests of the member of the audience with respect to one or more topics.

The system, based on the audience member attribute, predicts an audience interaction at block 310 using a prediction model generated with machine learning. The machine learning model, for example, can comprise a deep learning neural network reinforcement learning model, or similar such machine learning model.

The system at block 312 generates a predictive alert corresponding to the audience interaction predicted and, during the presentation, generates at block 314 a user interface for displaying the predictive alert to the presenter using an electronic device.

In certain embodiments, the sensor-generated signals convey an image of the member of the audience, the image captured by a camera sensor. The system can incorporate facial recognition technology. Accordingly, the system can determine the identity of the member of the audience using facial recognition with respect to the image conveyed.

In certain embodiments, the system can retrieve biographical data from various sources based on the identity of the member of the audience. The system, in some embodiments, obtains biographical data corresponding to the member of the audience by searching multiple networked sites, such as social network sites, professional organization websites, publicly accessible enterprise databases, and the like. The system can retrieve the biographical data from one or more such networked sites based on the identity of the member of the audience.

If the mode of presentation is an in-person presentation before an audience, the electronic device can comprise, for example, augmented reality (AR) glasses worn by the presenter. The system can present the user interface on the AR glasses, displaying the predictive alert by highlighting the member of the audience as seen with the AR glasses and displaying text adjacent thereto. The text can indicate a topic of a predicted question or a predicted comment by the member of the audience. Additionally, or alternatively, the system can present the user interface on the display of a computing/communication device, such as display 624 of computing system 612 (FIG. 6).

With respect to an online presentation over a communications network, the electronic device can be a computing/communication device, such as computing system 612 (FIG. 6), which communicatively couples to the communications network. A display of the device can display the user interface, which includes the predictive alert. The predictive alert can include an image of the member of the audience and text adjacent to the image, the text indicating a topic of a predicted question or a predicted comment.

If the presentation is simultaneously presented via a data communications network to a first group of the audience online, including the audience member, and a second group of the audience in person, the user interface can display the predictive alert by displaying an image of the online member of the audience, the image received via the data communications network, and displaying text adjacent to the image indicating a topic of a predicted question or a predicted comment.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
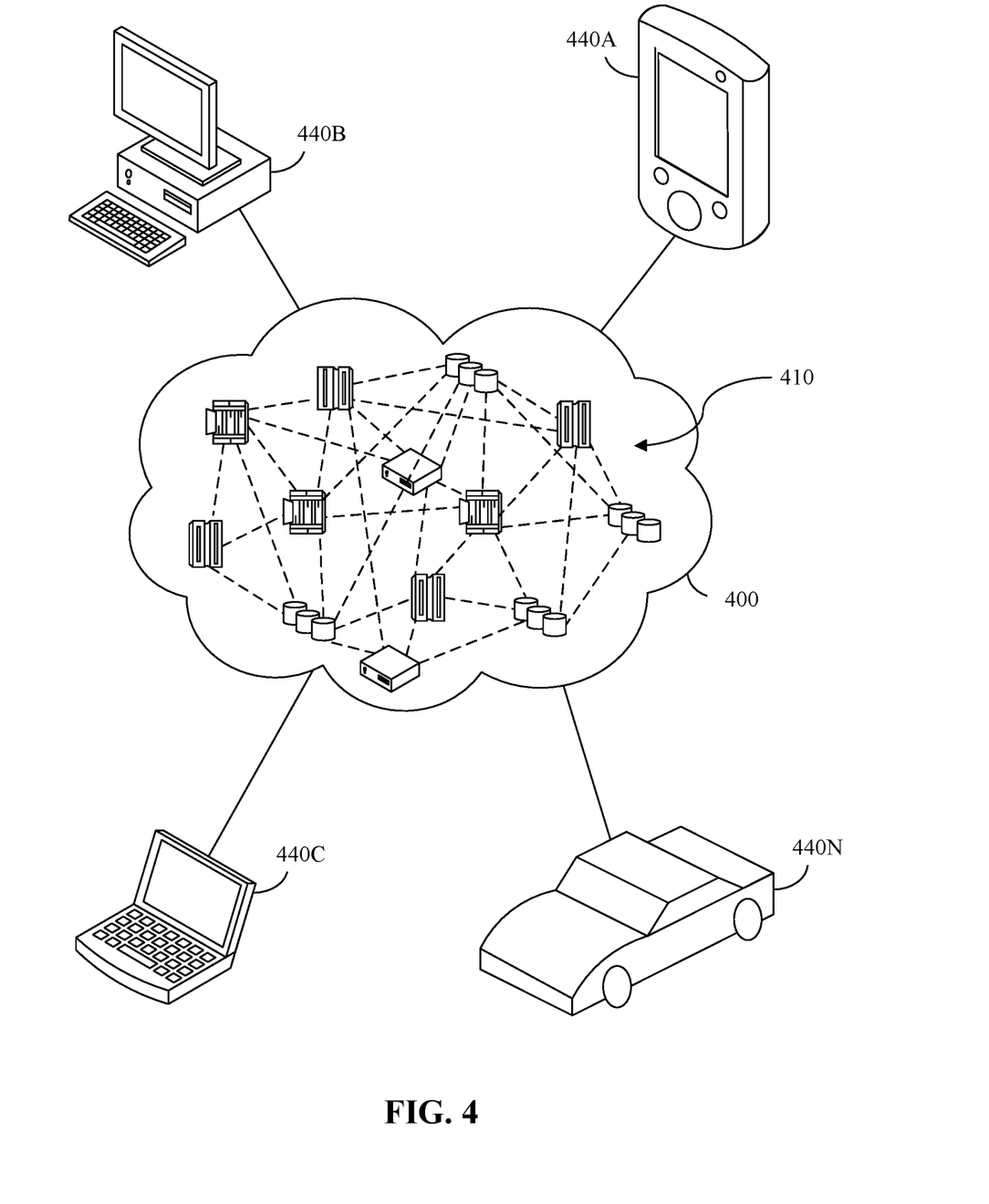
FIG. 4 depicts a cloud computing environment according to an embodiment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
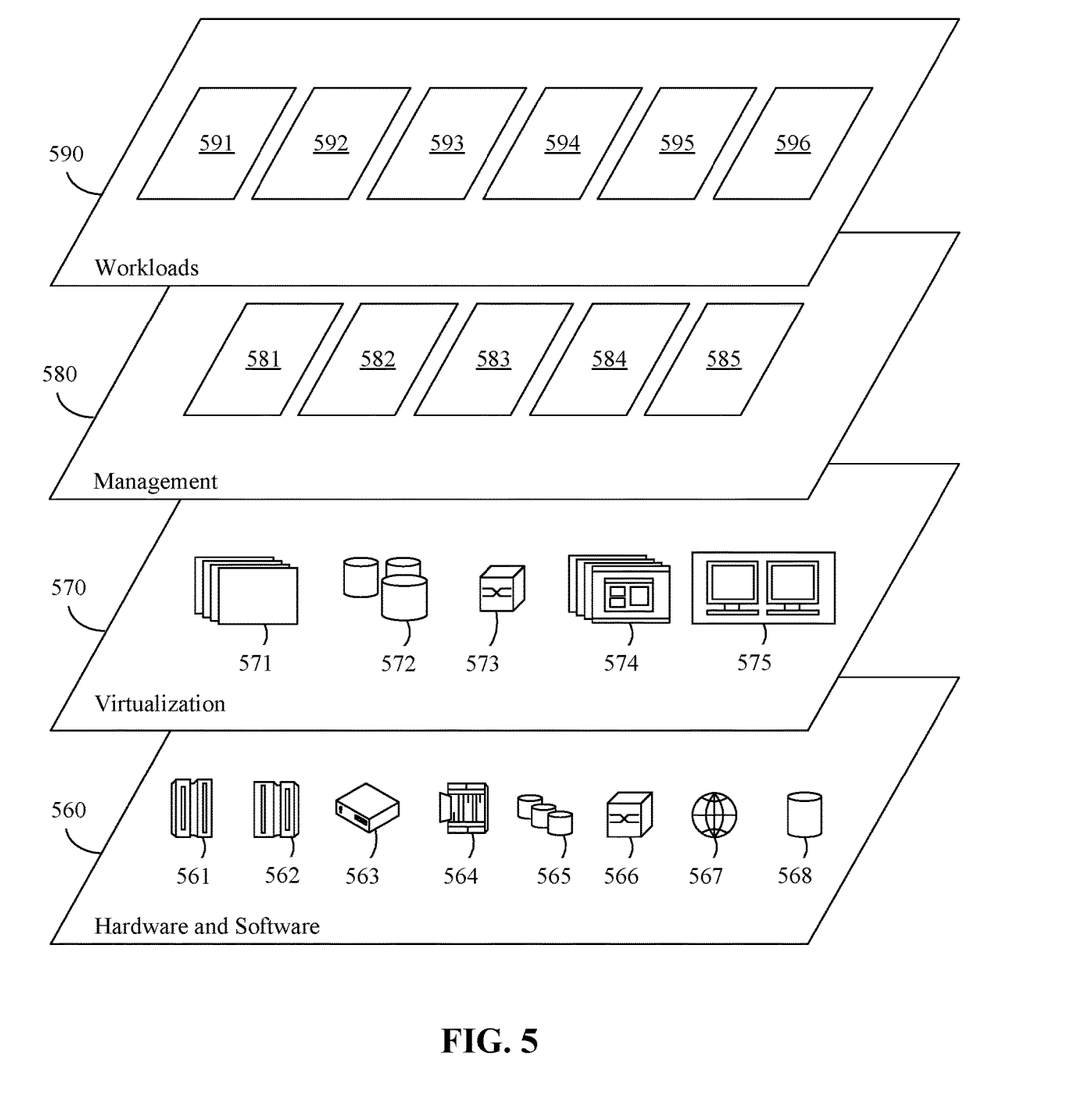
FIG. 5 depicts abstraction model layers according to an embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and cognitive enablement system 596

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include cognitive enablement system 596 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "approximately" means nearly correct or exact, close in value or amount but not precise. For example, the term "approximately" may mean that the recited characteristic, parameter, or value is within a predetermined amount of the exact characteristic, parameter, or value.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "audience member" and "member of the audience" mean a human being among a group of human beings comprising an audience. "Audience," as defined herein, refers to a group of human beings who audibly and/or visibly receive a presentation from a presenter. Relatedly, as defined herein, "presenter" refers to a human being engaged in making a presentation before an audience. As defined herein, the terms "user" and "participant" and "individual" also refer to human beings.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor configured to initiate operations including:
detecting sensor-generated signals received from at least one of a plurality of dispersed network-configured sensors and corresponding to physical movement of a member of an audience during a presentation by a presenter;
converting the sensor-generated signals to vectorized data structures for inputting to a classification model generated with machine learning;
classifying the physical movement as a prelude to a likely audience interaction, the classifying performed by the classification model based on the vectorized data structures;
in response to the classifying, determining an audience member attribute associated with the member of the audience;
predicting an audience interaction based on the audience member attribute using a prediction model generated with machine learning;
generating a predictive alert corresponding to the audience interaction predicted; and
during the presentation, generating a user interface for displaying the predictive alert to the presenter using an electronic device, wherein a mode of the presentation comprises an in-person presentation before the audience, wherein the electronic device is an augmented reality (AR) glasses worn by the presenter, and wherein the user interface is shown on the AR glasses and displays the predictive alert by highlighting the member of the audience as seen with the AR glasses and displaying text adjacent thereto indicating a topic of a predicted question or a predicted comment by the member of the audience.

2. The system of claim 1, wherein the network-configured sensors include at least one of an IoT motion sensor, mobile device sensor, wearable device sensor, or camera sensor.

3. The system of claim 1, wherein the audience member attribute comprises an identity of the member of the audience, wherein the sensor-generated signals convey an image of the member of the audience, the image captured by a camera sensor, and wherein the identity of the member of the audience is determined by a facial recognition system based on the image conveyed.

4. The system of claim 1, wherein the audience member attribute comprises biographical data corresponding to the member of the audience, and wherein the biographical data is obtained by searching a plurality of networked sites and retrieving the biographical data from at least one of the plurality of networked sites based on the identity of the member of the audience.

5. The system of claim 1, wherein another mode of the presentation comprises transmitting the presentation over a communications network, wherein the electronic device is a computing/communication device communicatively coupled to the communications network, and wherein the user interface displays the predictive alert by displaying an image of the member of the audience and displaying text adjacent to the image indicating a topic of a predicted question or a predicted comment.

6. A system, comprising:
a processor configured to initiate operations including:
detecting sensor-generated signals received from at least one of a plurality of dispersed network-configured sensors and corresponding to physical movement of a member of an audience during a presentation by a presenter;
converting the sensor-generated signals to vectorized data structures for inputting to a classification model generated with machine learning;
classifying the physical movement as a prelude to a likely audience interaction, the classifying performed by the classification model based on the vectorized data structures;
in response to the classifying, determining an audience member attribute associated with the member of the audience;
predicting an audience interaction based on the audience member attribute using a prediction model generated with machine learning;
generating a predictive alert corresponding to the audience interaction predicted; and
during the presentation, generating a user interface for displaying the predictive alert to the presenter using an electronic device, wherein the presentation is simultaneously presented via a data communications network to a first group of the audience online, including the audience member, and a second group of the audience in person, wherein the presentation is simultaneously presented via a data communications network to a first group of the audience online, including the audience member, and a second group of the audience in person, wherein the user interface displays the predictive alert by displaying an image of the member of the audience, the image received via the data communications network, and displaying text adjacent to the image indicating a topic of a predicted question or a predicted comment.

7. A computer program product, the computer program product comprising:
one or more computer-readable storage media and program instructions collectively stored on the one or more computer-readable storage media, the program instructions executable by a processor to cause the processor to initiate operations including:
detecting sensor-generated signals received from at least one of a plurality of dispersed network-configured sensors and corresponding to physical movement of a member of an audience during a presentation by a presenter;
converting the sensor-generated signals to vectorized data structures for inputting to a classification model generated with machine learning;
classifying the physical movement as a prelude to a likely audience interaction, the classifying performed by the classification model based on the vectorized data structures;
in response to the classifying, determining an audience member attribute associated with the member of the audience;
predicting an audience interaction based on the audience member attribute using a prediction model generated with machine learning;
generating a predictive alert corresponding to the audience interaction predicted; and during the presentation, generating a user interface for displaying the predictive alert to the presenter using an electronic device, wherein a mode of the presentation comprises an in-person presentation before the audience, wherein the electronic device is an augmented reality (AR) glasses worn by the presenter, and wherein the user interface is shown on the AR glasses and displays the predictive alert by highlighting the member of the audience as seen with the AR glasses and displaying text adjacent thereto indicating a topic of a predicted question or a predicted comment by the member of the audience.

8. The computer program product of claim 7, wherein the network-configured sensors include at least one of an IoT motion sensor, mobile device sensor, wearable device sensor, or camera sensor.

9. The computer program product of claim 7, wherein the audience member attribute comprises an identity of the member of the audience, wherein the sensor-generated signals convey an image of the member of the audience, the image captured by a camera sensor, and wherein the identity of the member of the audience is determined by a facial recognition system based on the image conveyed.

10. The computer program product of claim 7, wherein the audience member attribute comprises biographical data corresponding to the member of the audience, and wherein the biographical data is obtained by searching a plurality of networked sites and retrieving the biographical data from at least one of the plurality of networked sites based on the identity of the member of the audience.

11. The computer program product of claim 7, wherein another mode of the presentation comprises transmitting the presentation over a communications network, wherein the electronic device is a computing/communication device communicatively coupled to the communications network, and wherein the user interface displays the predictive alert by displaying an image of the member of the audience and displaying text adjacent to the image indicating a topic of a predicted question or a predicted comment.

12. The computer program product of claim 7, wherein the presentation is simultaneously presented via a data communications network to a first group of the audience online, including the audience member, and a second group of the audience in person, wherein the user interface displays the predictive alert by displaying an image of the member of the audience, the image received via the data communications network, and displaying text adjacent to the image indicating a topic of a predicted question or a predicted comment.

* * * * *